(12) United States Patent
Puetter et al.

(10) Patent No.: US 6,895,125 B2
(45) Date of Patent: *May 17, 2005

(54) ACCELERATED SIGNAL ENCODING AND RECONSTRUCTION USING PIXON METHOD

(75) Inventors: Richard Puetter, San Diego, CA (US);
Amos Yahil, Stony Brook, NY (US);
Robert Piña, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 10/308,450

(22) Filed: Dec. 2, 2002

(65) Prior Publication Data

US 2003/0174900 A1 Sep. 18, 2003

Related U.S. Application Data

(63) Continuation of application No. 09/905,528, filed on Aug. 22, 2001, now Pat. No. 6,490,374, which is a continuation of application No. 09/333,172, filed on Jun. 14, 1999, now Pat. No. 6,353,688, which is a continuation-in-part of application No. 08/073,929, filed on Jun. 8, 1993, now Pat. No. 5,912,993.

(51) Int. Cl.[7] .............................. G06K 9/56; G06K 9/40
(52) U.S. Cl. ........................ 382/265; 382/205; 382/275
(58) Field of Search .................................. 382/205, 240,
382/217, 218, 228, 239, 260, 261, 265,
270, 275, 278, 279; 348/606, 607; 358/447,
463; 73/1.82

(56) References Cited

U.S. PATENT DOCUMENTS 5,179,193 A 1/1993 Bobsein et al.
5,440,647 A 8/1995 Floyd, Jr. et al.
5,467,404 A 11/1995 Vuylsteke et al.
5,517,585 A 5/1996 Dowling
5,588,032 A 12/1996 Johnson et al.
5,827,942 A * 10/1998 Madsen et al. .............. 73/1.82
5,912,993 A 6/1999 Puetter et al.
6,353,688 B1 3/2002 Puetter et al.
6,490,374 B2 * 12/2002 Puetter et al. .............. 382/265

OTHER PUBLICATIONS

Sauer, K., et al., *A Local Update Strategy for Iterative Reconstruction from Projections*, IEEE Transactions on Signal Processing, Feb. 1993, pp. 534–548, vol. 41, No. 2.

Xiong, Z., et al., *Marginal Analysis Prioritization for Image Compression Based on a Hierarchical Wavelet Decomposition*, 1993, pp. 546–549, IEEE.

Puetter, R. C., *Pixons and Bayesian image reconstruction*, reprinted from Image Reconstruction and Restoration, Jul. 25–26, 1994, San Diego, California, 1994, pp. 112–131, vol. 2302, Society of Photo–Optical Instrumentation Engineers, USA.

* cited by examiner

*Primary Examiner*—Mehrdad Dastouri
(74) *Attorney, Agent, or Firm*—Procopio, Cory, Hargreaves & Savitch

(57) ABSTRACT

The method identifies a Pixon element, which is a fundamental and indivisible unit of information, and a Pixon basis, which is the set of possible functions from which the Pixon elements are selected. The actual Pixon elements selected from this basis during the reconstruction process represents the smallest number of such units required to fit the data and representing the minimum number of parameters necessary to specify the image. The Pixon kernels can have arbitrary properties (e.g., shape, size, and/or position) as needed to best fit the data.

28 Claims, 5 Drawing Sheets

ACCELERATED SIGNAL ENCODING AND RECONSTRUCTION USING PIXON METHOD

This is a continuation of application Ser. No. 09/905,528, filed Aug. 22, 2001 now U.S. Pat. No. 6,490,374, which is a continuation of application Ser. No. 09/333,172, filed Jun. 14, 1999, now issued as U.S. Pat. No. 6,353,688, which is a continuation in part of Ser. No. 08/073,929, filed Jun. 8, 1993, now issued as U.S. Pat. No. 5,912,993.

Pursuant to 35 U.S.C. §202(c), it is hereby acknowledged that the U.S. Government has certain rights in the invention described herein, which was made in part with funds from the National Aeronautics and Space Administration, Grant No. NAG 51228, and from the U.S. Department of Energy, Grant No. DE-FG02-87ER40317.

COMPUTER APPENDIX

A computer program listing appendix containing computer program source code for programs described herein has been submitted concurrently with the filing of this application on a compact disc. The computer program listing appendix is incorporated herein by reference in its entirety. The computer program listing appendix contains material that is subject to copyright protection. The copyright owner has no objection to the facsimile reproduction by anyone of the patent document or patent disclosure, as it appears in the Patent and Trademark Office patent file or records, but otherwise reserves all copyright rights.

FIELD OF THE INVENTION

The present invention relates generally to signal encoding and reconstruction. More particularly, the present invention relates to devices and methods for reconstructing a signal from measurement data from a detector.

BACKGROUND OF THE INVENTION

Exact measurement of the properties of nature is a common goal within the experimental sciences. Similarly, medical diagnostics and communications technology, among other scientific endeavors, seek the ability to obtain exact measurement of properties within their respective fields, e.g., MRI or free space optical or other electromagnetic transmission. Optimal extraction of the underlying measurement data requires the removal of measurement defects such as noise and limited instrumental resolution. However, in spite of the availability of highly sophisticated instruments, noise and instrumental signatures are still present in the data, making the measurement only approximate.

An area of experimental science in which instrumental signatures are particularly a problem is astronomy, where the signal sources to be measured are very faint. Even when the instruments are made essentially noise-free, instrumental signatures related to finite spatial, spectral, or temporal resolution remain. At this point, image reconstruction is required to remove the instrumental signatures.

One of the most powerful approaches to image restoration, e.g., removal of point-spread-function blurring, is Bayesian image reconstruction, which includes Goodness-of-Fit (Maximum Likelihood) and Maximum Entropy data fitting. This family of techniques employs a statistical relationship between various quantities involved in the imaging process. Specifically, the data, D, consisting of the original noisy, blurred image model is linked to the desired noise-free, unblurred image model, I, through a model, M. The model M includes all aspects of the relationship between the data and the image, e.g., that the data is normally collected on a rectangular grid and that the data is related to the image model through the relationship $$D(i)=(I*H)(i)+N(i) \qquad (1)$$

where $D(i)$ is the data in cell i (typically a pixel), I is the image model, H is the point-spread-function (PSF) due to instrumental and possible atmospheric blurring, $*$ is the spatial convolution operator, i.e., $$(f*g)(x) = \int_{-\infty}^{\infty} dx' f(x')g(x-x') \qquad (2)$$

and N represents the noise in the data, assuming the PSF is a function only of displacement between pixels. In general, the PSF can vary across the field.

Image reconstruction differs from standard solutions of integral equations due to the noise term, N, that nature of which is only known statistically. Methods for solving such an equation fall under the categories of (1) direct methods, which apply explicit operators to data to provide estimates of the image, and (2) indirect methods, which model the noiseless image, transform it only forward to provide a noise-free data model, then fit the parameters of the image to minimize the residuals between the real data and the noise-free data model. The direct methods have the advantage of speed, but they tend to amplify noise, particularly at high frequencies. The indirect methods supposedly exclude the noise, however, the required modeling is a disadvantage. If a good parametric form for the image is known a priori, the result can be very good.

To statistically model the imaging process, Bayesian image reconstruction methods analyze the properties of the joint probability distribution of the triplet, D, I and M, i.e., $p(D,I,M)$. Applying Bayes' Theorem [$p(A,B)=p(A|B)p(B)=p(B|A)p(A)$, where $p(X|Y)$ is the probability of X given that Y is known] provides:

$$p(D, I, M) = p(D|I, M)p(I|M)p(M) \qquad (3)$$
$$= p(I|D, M)p(D|M)p(M)$$

By setting the first factorization of $p(D,I,M)$ in Equation 3 equal to the second factorization provides the usual starting point for Bayesian reconstruction:

$$p(I|D, M) = \frac{p(D|I, M)p(I|M)}{p(D|M)} \qquad (4)$$

A common goal of Bayesian image reconstruction is to find the M.A.P. (Maximum A Posteriori) image, I, which maximizes $p(I|D,M)$, i.e., the most probable image given the data and model. (Note that other image estimates, e.g., the average image, $<I>=\int_{D,M} dMdD\ I\ p(I|D,M)$, may be used here and in the methods described in the detailed description.) (MAP image reconstruction is also sometimes known as parametric least-squares fitting.)

It is common in Bayesian image reconstruction to assume that the model is fixed. In this case, $p(D|M)$ is constant, so that $$p(I|D,M) \propto p(D|I,M)p(I|M). \qquad (5)$$

The first term, $p(D|I,M)$, is a goodness-of-fit quantity, measuring the likelihood of the data given a particular image and model. The second term, p(I|M), is normally referred to as the "image prior", and expresses the a priori probability of a particular realization of the image given the model. In Goodness-of-Fit (GOF) image reconstruction, p(I|M) is effectively set to unity, i.e., there is no prior bias concerning the image. Only the Goodness-of-Fit (p(D|I,M)) is maximized during image reconstruction. Typically, $$p(I|D,M)=\exp(-\chi^2_R/2), \qquad (6)$$

where $\chi^2_R$ is the chi-square of the residuals, $R(\equiv D-I*H)$. While this approach ensures that the frequency distribution of the residuals has a width which is characteristic of the noise distribution, it normally results in images with spurious spatial features where the data has a low signal to noise ratio (SNR). Also, the large amplitude residuals often show a strong spatial correlation with bright features in the data.

When no parametric model of the image is known, the number of image model parameters can quickly become comparable to, or exceed, the number of data points. In this case, a MAP solution becomes inappropriate. For example, if the number of points in the image model equals the number of data points, the nonsingular nature of the transform in Equation 1 assures that there is a solution for which the data, including the noise, are exactly modeled with zero residuals. This is the same poor solution, with all its noise amplification, obtained by the naive Fourier deconvolution. Thus, an unrestricted indirect method is no better at controlling noise than a direct method, and therefore, the image model must be restricted in some way. The indirect methods restrict the image model and differ only in the specifics of image restriction.

A simple restriction is to constrain the model image to be positive. Since even a delta-function image is broadened by the PSF, it follows that the exact inverse of any noisy data with fluctuations on scales smaller than the PSF must be both positive and negative. By preventing the image from becoming negative, the noise-free data model cannot fluctuate on scales smaller than the PSF, which is equivalent to smoothing the data on the scale of the PSF. However, this Non-Negative Least-Squares (NNLS) fit method is not able to eliminate noise fitting on larger scales.

Maximum entropy (ME) image reconstruction solves many of the problems of the simpler GOF methods (e.g., NNLS). In ME imaging, one calculates a value for the image prior based upon "phase space volume" or counting arguments. Heuristically, p(I M) is written p(I M)=exp(S), where S is the entropy of the image in a given model. All ME methods capitalize on the virtues of incorporating prior knowledge of the likelihood of the image. The information entropy is maximized for a flat image, which eliminates structure not required by the data and suppresses noise fitting. The benefits of this are numerous, including eliminating the over-resolution problems of GOF methods and increasing the numerical stability of the calculations. The disadvantages are that the image prior used in ME takes the form of a global constraint, resulting in the enforcement of an average smoothness (average information content) on the entire image without recognizing that the density of information content, and, thus, the appropriate degree of smoothing, varies from location to location in the image. This results in oversmoothing of the image in some locations and undersmoothing it in others.

Many Bayesian image reconstruction methods assume that the model is fixed. Others, however, propose varying the model, such as the multi-channel image modeling of Weir (*Applications of Maximum Entropy Techniques to HST Data*, Proceedings of the ESO/ST-ECF Data Analysis Workshop, April 1991). In this method, the image is assumed to be a sum of pseudoimages convolved with a blurring function of various spatial scales. This method, while superior to many of its predecessors, may exhibit low-level spurious sources as ripples in the reconstructed image, and still displays some spatial correlation within the residuals.

The need remains for a method of image reconstruction which is capable of effectively reducing noise fitting without relying on a priori probabilities that result in excessive averaging of the image, but rather which adapts itself to the distribution of information content in the image. The following disclosure provides such a method.

SUMMARY OF THE INVENTION

It is an advantage of the present invention to provide a method for identifying a generalized image cell as an optimal basis for image reconstruction.

It is another advantage of the present invention to provide a method for minimizing the number of parameters, i.e., minimizing image model complexity, needed to reconstruct an image.

It is still yet another advantage of the present invention to provide a method for accelerating the computational speed for image reconstruction.

The method identifies a Pixon element, which is a fundamental and indivisible unit of information, and a Pixon basis, which is the set of possible functions from which the Pixon elements are selected. The actual Pixon elements selected from this basis during the reconstruction process represents the smallest number of such units required to fit the data and represent the minimum number of parameters necessary to specify the image. The Pixon kernels can have arbitrary properties (e.g. shape, size, and/or position) as needed to best fit the data. The only criterion is that the kernel functions be selected to efficiently model the image with the fewest number of components. The goodness-of-fit (GOF) is determined according to the chi-squared statistic, the Maximum Residual Likelihood (MRL) statistic, or a similar chi-squared statistic as appropriate to the data set being modeled.

The goal of the Pixon method of image reconstruction is to find the simplest model meeting a given quality of fit using the chosen GOF criterion. Unlike standard Bayesian methods, the Pixon method need not explicitly define an image prior (although it could). Rather it recognizes that finding the minimum complexity model for a given quality of fit satisfies the general goal of Bayesian methods, since simple models give rise to optimized image priors. If a prior were to be defined, it would increase monotonically with image model complexity. In this case, the specific functional form for the prior would have to be selected for the specific imaging case under consideration, e.g. based on the physics of the situation or built up from statistics gathered from a training set of data. Normally, however, it is sufficient to have a criterion with which to decide which is the simplest model among a family of models and to use this to choose the simplest model from amongst all images fitting the data to the specified quality.

The benefits of building a minimum complexity model are many. Since a minimum complexity model more critically fits the image to the data, the parameters of the image are more accurately determined since a larger fraction of the data is used to determine each one. For the same reason, a minimum complexity model does not show signal-correlated residuals, and hence provides unbiased source strength measurements to a precision limited only by the theoretical limits set by the noise statistics of the data. In addition, since the image is constructed from a minimum complexity model, spurious (i.e., artificial or numerically created) sources are eliminated. This is because a minimum complexity model only has sufficient parameters to describe the structures that are required by the data and has none left over with which to create false sources. Finally, because the Pixon method builds a critical model and eliminates spurious sources, it can achieve greater spatial resolution than competing methods and detect fainter sources that would otherwise be hidden by these spurious structures.

In application to astronomy, the input data is commonly obtained with a CCD detector array with a particular pixel size and shape. For example, in the imaging of star fields, the image would be best represented as a sum of point sources with arbitrarily precise positions and brightness. Since large regions of the data field will have few, if any, photon counts, portions of the pixel grid are unused, and the degrees of freedom, i.e., pixels, representing these portions of the image over-specify the data. In other portions of the image, the density of pixels may be too sparse to adequately represent the image. In this example the sizes, shapes of the Pixon kernels would be adjusted to decompose the image into the fewest number of Pixon elements. In Bayesian terms, since the number of Pixon kernels used would be much fewer than the total number of pixels in the grid, any sensible image prior term in Equation 5 (in the Background of the Invention) would be greatly improved.

BRIEF DESCRIPTION OF THE DRAWINGS

The present invention will be better understood from the following detailed description of some preferred embodiments of the invention, taken in conjunction with the accompanying drawings, in which like numbers correspond to like parts, and in which:

FIG. 4a is a diagram of the input data and FIG. 4b is a surface plot of the input data;

FIG. 5a is a diagram of a reconstructed image, FIG. 5b is a surface plot of the reconstructed image, and FIG. 5c shows the residuals;

FIG. 6a is a diagram of a reconstructed image, FIG. 6b is a surface plot of the reconstructed image, and FIG. 6c shows the residuals;

FIG. 7b shows the new smaller scales kernels in the second iteration along with the larger scale kernels from the first iteration; FIG. 7c shows the third iteration Pixon map; and FIG. 7d shows the final Pixon map.

DETAILED DESCRIPTION OF THE PREFERRED EMBODIMENTS

In an imaging system, a CCD detector having a grid of N×N pixels is used to collect incoming photons from the light source to generate an input image. A computer is used to reconstruct the input image using the Pixon method, in which a statistical description is applied to the imaging process and the simplest image model is selected from all possible image models that fit the data to within a specified quality as determined by the selected GOF criterion. The model is determined through a number of iterations that progressively improve the fit and modify the complexity of the image model to find the simplest model having the specified fit quality. A key element in building the image model is decomposition of the image into the fewest number of parts and the selection of a set of basis functions (the components into which the image will be reduced), that facilitates image decomposition into a small number of units. These units are called "Pixon elements", or "Pixon kernels". The set of basis functions is called the Pixon basis. It is the "language" in which the image model is described or written. Note that in general, this basis set will be "over-complete", i.e., have many more elements than a "complete" basis set which has exactly enough elements to specify arbitrary images, but no more. Over-completeness of the basis set aids in the ability to reduce the number of elements used in forming the minimum complexity model for the image.

Once the Pixon basis, or language, is chosen, the set of Pixon elements actually selected to decompose the image is irreducible. This is because by definition, within this language, the Pixon elements selected form the minimum complexity model, i.e. they comprise the set with the fewest number of elements that can fit the data within the specified tolerance. Each of the Pixon elements, then, is an irreducible unit, or quanta, of image information content. The modeling process is explained in detail below.

Figure 1:
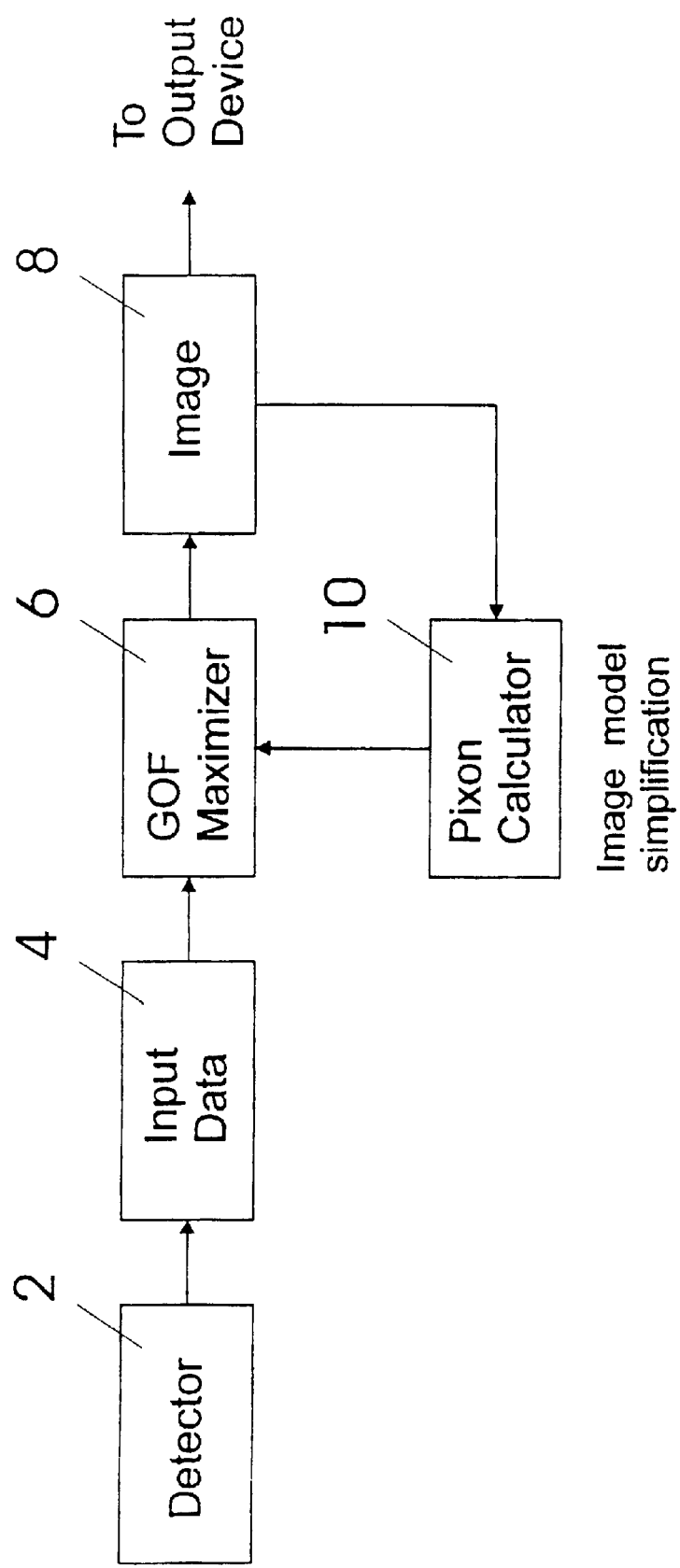
FIG. 1 is a block diagram of the steps in reconstructing an image according to the present invention.

The generalized process flow is illustrated in FIG. 1. A detector/input means 2 collects the incoming signal to produce data 4. The data is fed into the GOF maximizer 6, in which the image 8 is optimized to improve the GOF to within the specified quality. This image 8, along with any other prior information, is used to update the Pixon map at Pixon calculator 10. The goal of the Pixon calculator is to determine how the image model can be simplified while still allowing the GOF to remain within tolerances. Iteration between GOF maximizer and Pixon map model, by continually simplifying the image model and then reoptimizing to maintain the GOF to within the required quality, eventually finds the simplest model capable of doing so.

While the exemplary system to which the Pixon method is applied involves image reconstruction, such as for astronomical or medical images, the method is equally applicable to other forms of signal processing which would benefit by minimizing the degrees of freedom. For example, the detector/input means could be an array of infrared detectors that provide time series data for construction of an image, or the detector/input means could be an RF modulator which is providing a signal which is to be compressed before transmission.

The preferred embodiment of the Pixon method minimizes image model complexity by smoothing the image locally as much as the data will allow, thus reducing the number of independent patches, or Pixon elements, in the image. Specifically, the image $I(x')$ is set equal to the pseudoimage convolved with the Pixon kernel (or shape) function of the local width, i.e., $$I(x') = \int d y' K_{Pixon}(x', y') I_{pseudo}(y'),  \quad (7)$$

where $I_{pseudo}(y')$ is the pseudoimage and $K_{Pixon}(x',y')$ is the positive Pixon kernel function with properties (shape and size) given by the Pixon map at position x',y' (determined by the Pixon calculator step). Also note that the evaluation of the image can be at a resolution higher than that of the data, and is normally performed on the rectangular grid on which the pseudoimage is defined. Solution of Equation 1 then involves optimization of the pseudoimage and selection of Pixon kernels to provide a minimum complexity image model. Solution for the pseudoimage once the Pixon kernels are selected can be achieved with any of a number of multidimensional minimization procedures, e.g. the conjugate gradient method. The process for selection of the Pixon kernels is at the heart of this invention and is described below.

As in the case of nonnegative least-squares fit methods, requiring the pseudoimage to be positive eliminates fluctuations in the image on scales smaller than the width of the kernel function. This scale is adapted to the data. This image is convolved with the point-spread-function (PSF) and compared to the data to determine the GOF. As can be seen from Equation 7, the Pixons elements used to decompose the image are not cells with sharp boundaries, but are, in fact, "fuzzy" cells, i.e. kernel function shapes that overlap each other. Because of this overlap, image values in regions with overlapping Pixon kernels are correlated. Hence the number of degrees of freedom in the image are significantly less than the number of pseudo-pixels. This means that at every point in the image there is a local scale over which the image is smooth. In fact, the "Pixon map", i.e., the "image" containing all of the Pixon kernel shapes and sizes, directly determines the local resolution obtained in the image reconstruction. This can be useful in the practical application of this technique since the method explicitly provides the actual value of the resolution (possibly different in different directions) achieved at each location in the reconstruction.

Using fuzzy Pixon kernels, it is known that at each point in the image, a pseudoimage is going to be smoothed over a local scale. If the true image is smoothed with Pixon kernels of very small width, the value of the smoothed image changes inappreciably, i.e., there is no change for convolution with a δ-function. As the widths of the Pixon kernels are increased, deviations of the smoothed value from the unsmoothed value become appreciable, especially when the Pixon kernel size exceeds the local smoothness scale of the image. A deviation becomes "appreciable" when it exceeds the local noise. Thus, the largest local smoothing consistent with the tolerance set by the noise is the goal.

For practical implementations, the Pixon kernel functions are commonly limited to radially symmetric functions. Usually, there appears to be little practical difference in the quality of the reconstruction so long as the Pixon shape is centrally concentrated and has a finite "footprint". Pixon kernels with infinite extent, e.g., Gaussian shape, have difficulties reconstructing images with high contrast since there is "leakage" of signal from bright sources into the low signal level regions of such Pixon kernels. Here, parabolic Pixon kernels are used, i.e., $$K_{pixon}(x')=1-\|x'\|^2/\delta^2, \quad (8)$$

With $K_{pixon}(x')=0$ for $\|x'\|>\delta$, where δ is the kernel width, since they are quick and easy to calculate. Again providing an analogy to astronomical imaging, using this model for the image is the mathematical equivalent of taking a picture with a CCD with pixels of variable position and size which are adaptively tuned to match the local structural scale of the image.

Use of different Pixon kernel profiles can sometimes be beneficial. Pixon kernels with sharper corners than the parabolic shape given above, for example, can be useful when modeling images of objects with sharp edges. In this situation, since kernels with sharper edges actually look more like the objects being modeled, fewer Pixon kernels need to be selected to provide an adequate fit to the data.

An important consideration for achieving fast computational speed is to select a Pixon basis (set of Pixon kernels) with a goal towards having them decompose the image into independent elements that have little coupling in the deconvolution process. For generic images, a multiresolution basis that hierarchically decomposes the image into structures of different scales has this desired property. If this is combined with a computational procedure that starts with the coarsest scales, solves for these structures, and then proceeds on to consider the next finer level of structure, great computational efficiency is achieved since the gradual introduction of finer levels of structure only introduces minor perturbations on the optimum solution for the coarse structures. In such a matched hierarchical procedure one could define a Pixon basis with a predetermined number of kernels, or "footprints" in a pixel array, having a uniform, symmetrical size and shape, e.g., circles, ellipses, squares, other polygons, etc, which are centered at locations which make up a pseudogrid. One would then start with selecting largest Pixon kernel at each location and optimize the pseudoimage. It should be noted that, while the size of the Pixon kernels are the same, the shapes may be different, e.g., circles on one part of the image, ellipses on another.

One possible approach to optimize the computational speed is to re-bin the data to a coarser resolution, then solve the problem with kernels appropriate to that resolution, i.e., the large pixons, then move to finer data resolution and pseudoresolution (resolution in the pseudoimage). For example, the collected data may be from a 128×128 pixel array, however, it might be convenient to re-bin the data to an 8×8 array and solve for an 8×8 pseudoimage, then proceed to finer scales, e.g., 16×16 data, and pseudoimage, etc. While the data should potentially be carried all the way down to the original resolution, the pseudoimage need not be carried down to that level in the case of poor data. However, it may be beneficial to go finer than the original resolution in the case of high quality data. As the resolution becomes finer, new centers are defined around which to place the kernels.

In some parts of the image the data would be fit within the desired quality. However, in part of the image with detectable structure on smaller scales, the fit would be poor. A second iteration would be conducted in which one would allow the introduction of the next smallest Pixon kernel. The Pixon calculator would determine in which regions of the image the larger Pixon kernel allowed an acceptable fit and retain this kernel in those locations. However in the other locations, the smaller Pixon kernel would be assigned. Next, the pseudoimage would be reoptimized to improve the GOF. Subsequent iterations would proceed to increasingly smaller Pixon kernels. Alternatively, before allowing the introduction of new smaller kernel function, several iterations of pseudoimage optimization (GOF maximization) and Pixon map calculation (Pixon calculator) can be performed. Ideally, if the Pixon basis and computational procedure (order in which Pixon kernels are searched) are well chosen, few (e.g. <3) GOF/Pixon map iterations are required before proceeding to smaller kernels.

Figure 2:
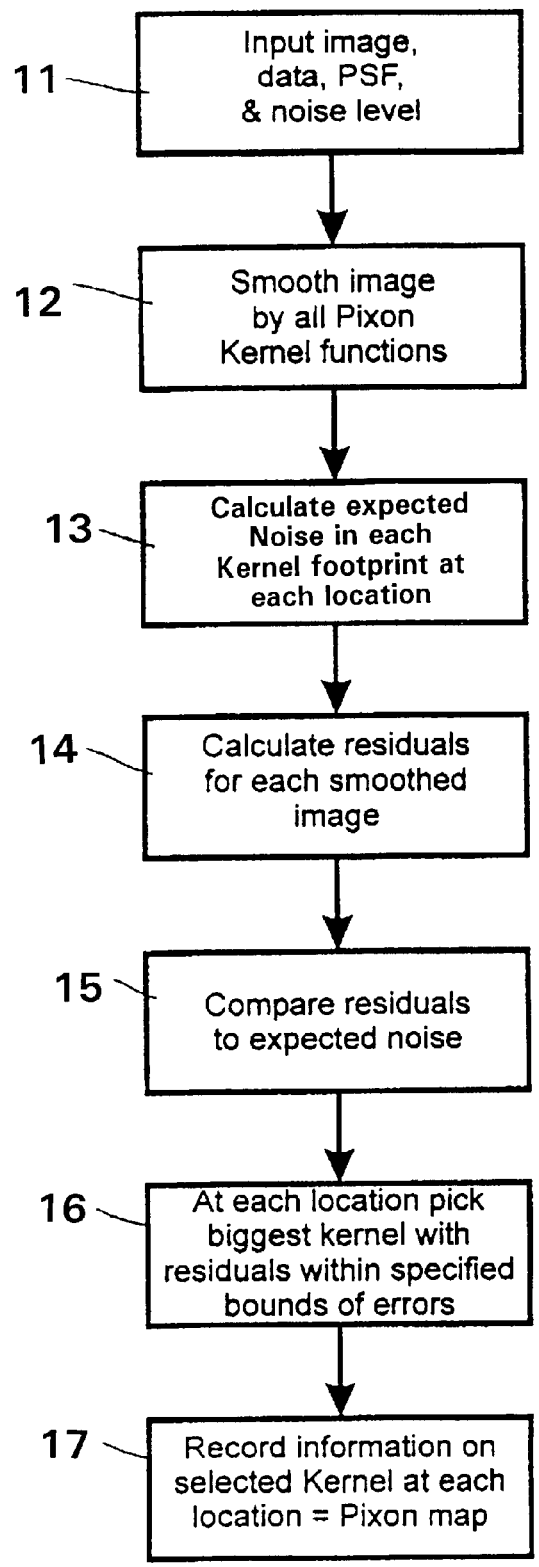
FIG. 2 is a block diagram of the Pixon map calculation.

One procedure for determining whether or not a larger kernel function would still allow an acceptable fit at any given location is to smooth the image locally with each of the Pixon kernels in the Pixon basis set. The local fit to the data, e.g., the value of chi-squared weighted by the shape of the kernel function mapped into data space, i.e., the kernel "footprint" (H*K), then determines the quality of the local fit. Solution of Equation 1 then proceeds by iterating between pseudoimage optimization and Pixon kernel selection. The largest kernel having an acceptable fit can then be selected location by location in the image. The procedure is schematically illustrated in FIG. 2, which shows how image model simplification is achieved through the selection at each step of the largest possible Pixon kernel at each location in the image. This sequence represents a single iteration of the Pixon map calculation. The overall flowchart for image reconstruction is provided in FIG. 8, which is describe below. The steps of the Pixon map calculation are performed primarily by the Pixon calculator subroutine, filename: [pxncal.pro], provided in the computer program listing appendix. In the Pixon calculator, the Pixon map is determined by a series of local GOF and SNR conditions. Referring to FIG. 2, in step 11, the image data, PSF and noise level are all input. The image is smoothed by all Pixon kernel functions (step 12). In step 13, the expected noise is calculated for each kernel footprint. The residuals are computed over the footprint for each smoothed images (step 14), and then compared to the expected noise in step 15. Each Pixon kernel is checked to make sure its shape has a higher SNR than other shapes of the same size. At each location, the largest kernel with residuals within the specified criteria is selected (step 16). The information for the selected kernel is recorded, becoming part of the Pixon map (step 17).

Generally, in addition to checking the ability of a particular Pixon kernel to permit an adequate local GOF, the SNR of signal contained with the Pixon kernel is evaluated relative to the expected noise within the kernel. This is useful for rejecting Pixon elements that have insufficient signal relative to the noise (e.g. SNR<3) to warrant inclusion in the image model. Again, the SNR level of significance is a user adjustable parameter.

Figure 8:
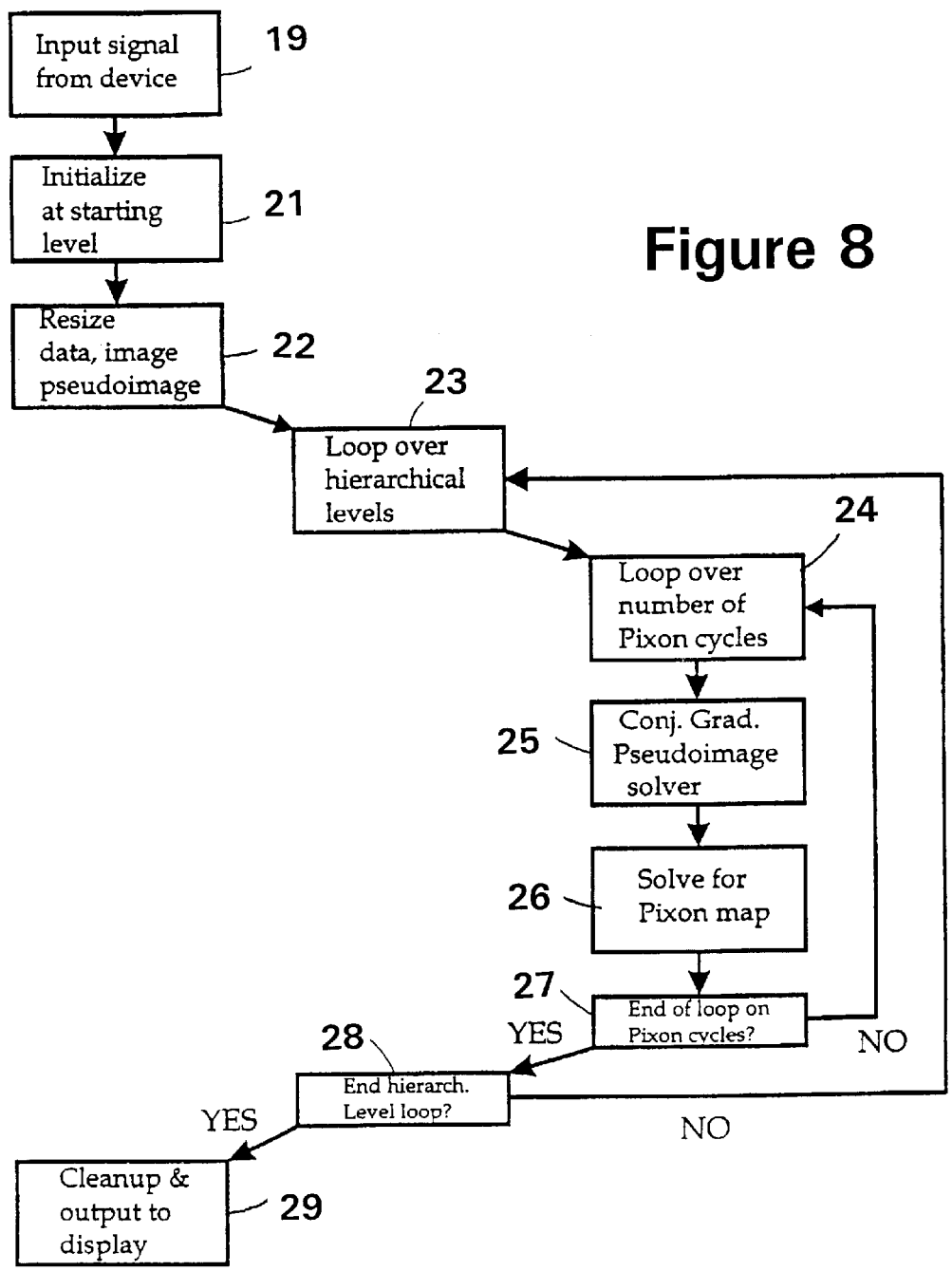
FIG. 8 is a flowchart of the accelerated Pixon method.

FIG. 8 provides the top level flowchart for image reconstruction using the Pixon method, with corresponding references to several subroutines of the computer program provided in the accompanying computer program listing appendix. In step 19, the input signal is received from the detector array or other receiving device. The sequence initializes at the starting level in step 21, which is performed by the [init.pro] program contained in the computer program listing appendix. In the next step, step 22, the data, image and pseudoimage are resized, per the [imrsz.pro] subroutine. Steps 23 and 24 are carried out in the initialization and Pixon calculator programs [init.pro] and [pxncal.pro], where the hierarchy of levels is set up. Loops will be performed over the hierarchical levels and over a number of Pixon cycles within the hierarchical levels. Step 25 solves for the pseudoimage using the conjugate gradient method, the procedure for which is carried out in the [lincg.pro] subroutine. Step 26 provides the solution for the Pixon map, which involves operations by a number of subroutines, including [pxncal.pro], which, among other things, sets the Pixon index structure, and [ipxn2pxn.pro], which converts a Pixon index structure into a Pixon map. Step 27 determines whether sufficient smoothing of the image has occurred such that no further iterations of Pixon calculation are required, which decision is also based in the Pixon calculator subroutine [pxncal.pro]. If the smoothing is not acceptable, the process will repeat, beginning at step 24. If the local smoothing criteria are met, the Pixon calculator will determine if the hierarchy of levels has been completed (step 28). If so, the hierarchical level loop is terminated and the completed Pixon map is converted to data that can be output to an appropriate display (step 29). As will be apparent to those of skill in the art, the above-identified subroutines interface with a number of other subroutines that are included in the computer program listing appendix, but which are not specifically referenced or described in the written description.

Complexity can be minimized by having kernel functions of different sizes to allow for multi-resolution, but also by appropriate selection of their shapes. For example, circularly symmetric kernels, are adequate for reconstruction of most astronomical images, while elliptical kernels may serve better for reconstruction of images with elongated features, such as medical images or an aerial photograph of a city. Altogether, the choice of kernels is the "language" by which an image model is specified, which should be rich enough to characterize the independent elements of the image. Ideally one would like to use Pixon kernels that have a continuous distribution of sizes. However, this is not practical in real-life calculations, so a finite set of Pixon kernels with set sizes is normally selected. Logarithmic spacing of the kernel sizes appears to provide a better result, with 2 to 4 kernel sizes covering an octave (factor of 2) in size. For example, one could select 2 to 4 kernels with sizes in the range between 2 pixels in diameter and 4 pixels in diameter. In addition, it is usually sufficient to limit the range of sizes to a few octaves, e.g., if one selected a 5 octave size range one might have Pixon kernels with diameters ranging between 1 pixel and 16 pixels. Generally one will select a kernel with diameter 1 pixel (a delta-function) as the smallest kernel since this allows the image to have structures as small as the finest that can be resolved on the pseudoimage grid. In the case of images, the units used to determine an octave are the pixels of an image detector. In the exemplary embodiment, the possible sizes of the kernels, each of which is centered on a pixel, fall within a range that increases uniformly logarithmically. Thus, for example, if one selected a Pixon basis that spanned 3 octaves in size and with 2 kernels per octave, one would have Pixon kernels of sizes 1, $\sqrt{2}$, 2, $2\times\sqrt{2}$, 4, $4\times\sqrt{2}$, and 8. In addition to the circular kernels, elliptical kernels may be used for images with clearly elongated features, such as might be encountered in photographs or medical images. Gaussian curves, or "bumps" can also be used as Pixon kernels. Any given image reconstruction is not restricted to a single kernel shape and can include combinations of kernel shapes, for example, circles and ellipses as needed to best smooth the image.

The Pixon method of image reconstruction consists of a simultaneous search for the broadest possible kernel functions and their associated pseudoimage values that together provide an adequate fit to the data. In a non-hierarchical approach, one solves for the pseudoimage given a Pixon map of kernel functions, then attempts to increase the scale sizes of the kernel function given the current image values. This approach can provide a fast solution, but experience shows that this is only in the rarest of circumstances. In the matched hierarchical approach, while the goal is the same, the selected Pixon basis elements decouple (or nearly decouple if performed in the right order) and facilitate minimum complexity image model building. A multiresolution Pixon basis with a procedure that starts with larger kernels and proceeds to smaller kernels is such a matched process. The method provides for significant computational acceleration since few GOF/Pixon map iterations are needed at each step to optimize the solution. The introduction of smaller kernels only mildly perturbs the quality of the solution obtained in regions of the image where larger kernels can be used.

Figure 7A:
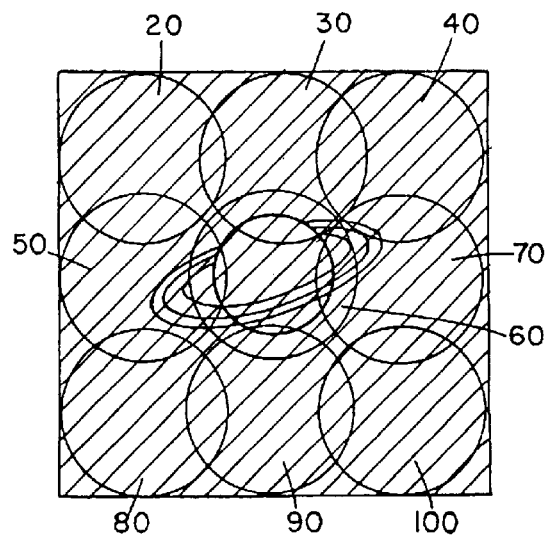
FIGS. 7a through 7d illustrate a simulated image reconstruction sequence using hierarchical, multiresolution decomposition of the image model, with FIG. 7a showing noisy input data with a first iteration Pixon map.

FIGS. 7a–7d provide a simplified simulated sequence of image reconstruction using the third, accelerated method of determining Pixon basis. FIG. 7a shows the noisy input data on an array of pixels from which the true image is to be reconstructed with a first iteration Pixon map containing only the largest scales under consideration. An array of kernels, which are shown as circular footprints 20, 30, 40, 50, 60, 70, 80, 90, 100 are superimposed over the image grid 11 to create an initial Pixon map. (The underlying true, or ideal, image is shown. The diagonal lines indicate noise superimposed on the true image during the data collection process.) The Pixon calculator will then look at each kernel, or circle, to determine the SNR and GOF. Included within the Pixon calculator is a minimum SNR threshold and a requirement that the pseudoimage value be non-zero and greater than a pre-determined minimum. Looking at circle 20, for example, its footprint covers what appears to be merely background noise. In this case, the SNR for circle 20 will be below the SNR minimum, and the pseudoimage is likely zero, or at least lower than the minimum pseudoimage value. Thus, the kernel defined by circle 20 is deemed to have no component of the true image in it, and it is eliminated during the first iteration so that no further processing occurs within the footprint covered by that kernel. The same is true for circles 80, 90 and 100, which are then eliminated from the Pixon map.

Figure 7B:
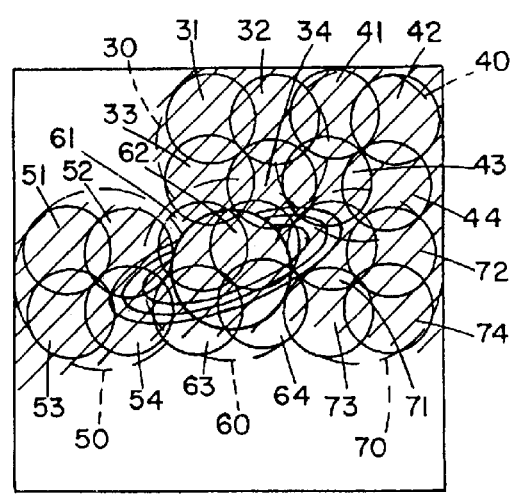
Figure 7C:
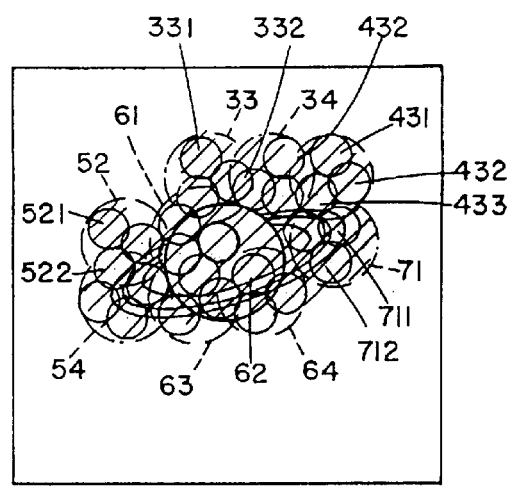
Figure 7D:
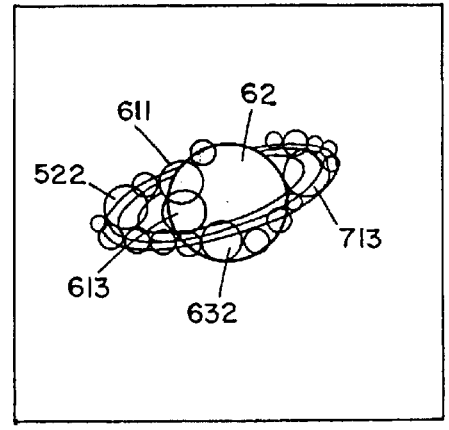

Referring still to FIG. 7a, it is clear that the image is included in the footprints covered by circles 30, 40, 50, 60 and 70. Assuming that all of the other circles have been eliminated because their SNR was below the minimum SNR threshold, the program will create a Pixon map consisting of circles 30, 40, 50, 60 and 70. The matched hierarchical Pixon procedure would then introduce the next smaller kernel. The Pixon calculator then determines are which locations these new kernels are required and where the larger kernels are still appropriate. It determines that smaller kernels (smaller circles) are required in some areas: 31–34 in circle 30, 41–44 in circle 40, 51–54 in circle 50, 61–64 in circle 60, and 71–74 in circle 70, as shown in FIG. 7b, which will then become the new Pixon map. FIG. 7b shows the new smaller scales kernels selected as the procedure moves to the next finest scale of image model decomposition. The Pixon map now contains both the larger scale kernels from the first iteration and the newer smaller scales. At this point, the following circles can be eliminated because they do not contain sufficient SNR: 31, 32, 41, 42, 43, 51, 53, 72, 73, 74. On the other hand, circle 62 covers the image and should have acceptable SNR and GOF such that no further processing is required for the area covered by circle 62. The remaining circles that do not meet the acceptance condition will then be progressively divided into smaller circles, such as shown in FIG. 7c, which shows the still smaller kernels added for the first time in a third iteration Pixon map, where, e.g., circle 43 is replaced by circles 431, 432, 433, circle 52 is replaced by 521, 522, 533. The Pixon calculator eliminates the third iteration circles containing no part of the image because their SNR falls below the minimum threshold. The end result, shown in FIG. 7d, is the full and final Pixon map having 21 Pixon elements of 5 different sizes, thus providing the lowest number of Pixon elements containing the largest amount of data.

The preceding example is provided as a simple illustration of the Pixon method and is not intended to limit the invention to the use of kernels with circular footprints or to any particular pattern of kernels within the grid.

The detailed steps involved in image reconstruction using the accelerated method are provided in the computer program contained in Appendix A hereto.

Figure 3:
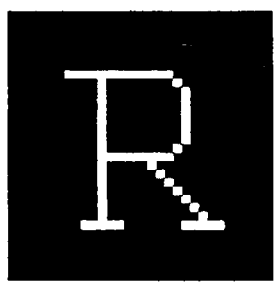
FIG. 3 is a diagram of a sample image that is to be reconstructed using the inventive method.
Figure 4A:
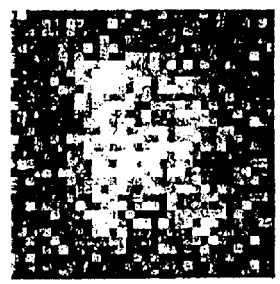
FIGS. 4a and 4b illustrate the input data, where
Figure 4B:
Figure 5A:
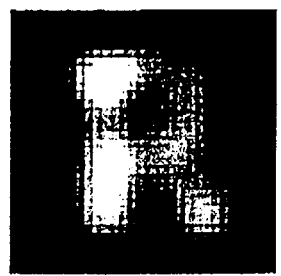
FIGS. 5a through 5c illustrate results of image reconstruction using the prior MRL reconstruction method, where

FIGS. 4a through 6c present image reconstructions of a synthetic data set, i.e., a data set in which the exact answer is known a priori. The input data, shown in FIG. 4a is a blurred image of the letter "R" at a signal-to-noise ratio of 3 on the peak pixel. (SNR=3 was selected to provide an extreme test of the various algorithms.) FIG. 4b is a surface plot of the input image. The true image is shown in FIG. 3. To produce the input image, the true image was blurred with a Gaussian PSF of FWHM=6 pixels, and Gaussian noise was added. FIG. 5a presents the results for a pure MRL GOF construction, labeled as "Prior Art". No prior image was used. FIG. 5b is a surface plot of the MRL GOF construction, and FIG. 5c shows the residuals with no spatial correlation. (See, e.g., Piña and Puetter, *Incorporation of Spatial Information in Bayesian Image Reconstruction: The Maximum Residual Likelihood Criterion*, Publications of the Astronomical Society of the Pacific, No. 104, pp.1096–1103, November 1992).

Figure 6A:
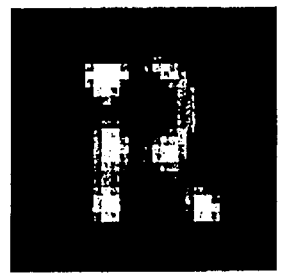
FIGS. 6a through 6c illustrate results of image reconstruction using the Pixon method, where
Figure 5B:
Figure 6B:
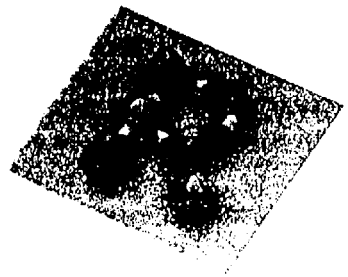
Figure 5C:
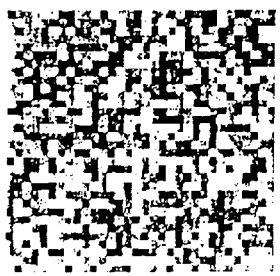
Figure 6C:
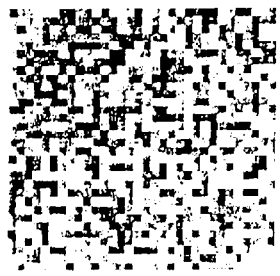

The Pixon reconstruction using the canonical $X^2$-statistic of the residuals is shown in FIG. 6a with even sharper resolution than the MRL image. Higher peak values are evident in the surface plot of FIG. 6b. As before, there is no spatial correlation in the residuals shown in FIG. 6c. This reconstruction used roughly 100 Pixon kernels to provide the image. This can be compared to the 32×32 (=1024) pixels in the data, each of which would be an image model parameter in standard image reconstruction approaches.

The above described procedures for reconstructing an image from raw data from a CCD array are provided as an illustration of the general process of using the Pixon method. The Pixon method is applicable to image construction of time series data from, for example, detectors used in infrared, ultraviolet, gamma ray or X-ray astronomy, and to image reconstruction for medical imaging techniques, such as magnetic resonance imaging (MRI), gamma ray and x-ray imaging, radar imaging, and photographic enhancement for, e.g., aerial and satellite reconnaissance.

Another application is in data compression where the key concept of building a minimum complexity model allows minimization of the number of parameters used to describe the image. The encoded signal would then have maximal compression without losing any information. In principle, the data could not be compressed any further. Data compression is accomplished by maximizing the Goodness-of-Fit to determine a preliminary encoded signal to a certain precision, then defining a initial Pixon map to fit the preliminary encoded signal. The process would be repeated with the goodness-of-fit and Pixon map being adjusted until the desired level of precision is attained with the smallest possible number of Pixon elements.

It will be evident that there are additional embodiments and applications which are not specifically included in the detailed description, but which fall within the scope and spirit of the invention. The specification is not intended to be limiting, and the scope of the invention is to limited only by the appended claims.

We claim:

1. A method for extracting information from a data signal having a plurality of data locations, the method comprising:

(a) defining a plurality of different basis function sets, each different basis function set comprising a plurality of identical basis functions, wherein each basis function within a basis function set encompasses a portion of the plurality of data locations so that the plurality of basis functions of a basis function set encompasses the entire data signal, and wherein the basis functions within each different basis function set encompass a different quantity of data locations within the data signal compared to the basis functions within other different basis function sets;

(b) decomposing the data signal with the plurality of different basis function sets;

(c) determining a signal-to-noise ratio and a goodness-of-fit for each basis function by mapping the function into data space and comparing the mapped function to the portion of the plurality of data locations within the basis function;

(d) comparing the signal-to-noise ratio and the goodness-of-fit for each basis function against predetermined pass criteria;

(e) selecting at each data location an optimal basis function from the plurality of different basis function sets wherein the optimal basis function is the broadest basis function that meets the predetermined pass criteria at that data location; and (f) generating a basis function map comprising a plurality of optimal basis functions, wherein each optimal basis function encompasses at least one data location within the data signal so that the entire data signal is encompassed by the plurality of optimal basis functions.

2. The method of claim 1, wherein the data signal comprises a detected image and the information to be extracted comprises an image having minimized degrees of freedom relative to the detected image.

3. The method of claim 2, wherein the detected image is arranged in an image grid corresponding to a plurality of pixels in an image detector and the smallest basis function corresponds to one pixel in the image detector.

4. The method of claim 3, wherein each basis function is centered on a pixel in the image detector.

5. The method of claim 2, wherein each basis function has a shape selected from the group consisting of circles, ellipses, squares, polygons, parabolic, and Gaussian.

6. The method of claim 1, wherein the data signal comprises time series data and the information to be extracted comprises an image having minimized degrees of freedom relative to the time series data.

7. The method of claim 6, wherein the time series data comprises input from an array of infrared detectors.

8. The method of claim 1, wherein the data signal comprises a signal which is to be modulated for RF transmission and the information to be extracted comprises a minimum number of parameters capable of describing the signal.

9. The method of claim 1, wherein the data signal comprises a signal which is to be encoded for compression.

10. The method of claim 1, wherein steps (b) and (c) are repeated hierarchically for each different basis function set beginning with the basis function set encompassing the largest portion of the plurality of data locations within the data signal and proceeding toward the basis function set encompassing the smallest portion of the plurality of data locations.

11. The method of claim 10, wherein repetition of steps (b) and (c) is terminated at the data location within the data signal once the optimal basis function corresponding to that data location is selected.

12. The method of claim 1, wherein the different basis function sets cover a range spanning three to five octaves.

13. The method of claim 1, wherein each basis function is radially symmetric.

14. A method for extracting information from a data signal comprising:

assembling a map comprising a plurality of optimal basis functions for modeling the information represented within the data signal, wherein the data signal has a plurality of data locations, and wherein the plurality of optimal basis functions is selected from a plurality of different basis function sets, each different basis function set encompassing a different quantity of data locations compared to other different basis functions of the plurality of different basis function sets, wherein each optimal basis function is selected by determining a local goodness-of-fit and a local signal-to-noise ratio for the plurality of different basis functions relative to the data locations encompassed by the basis function and, for each portion of the data signal, selecting as the optimal basis function the basis function that encompasses the greatest quantity of data locations and exceeds predetermined pass criteria.

15. The method of claim 14, wherein the predetermined pass criteria comprise signal-to-noise ratio and goodness-of-fit.

16. The method of claim 14, wherein each different basis function has a shape selected from the group consisting of circles, ellipses, squares, polygons, parabolic, and Gaussian.

17. The method of claim 14, wherein each different basis function is radially symmetric.

18. The method of claim 14, wherein each different basis function set has a size that is logarithmically spaced from the basis function sizes of other basis function sets.

19. The method of claim 18, wherein the basis function sizes for the different basis function sets cover a range spanning from three to five octaves.

20. The method of claim 14, wherein the optimal basis function is selected by, until the predetermined criteria are met, repeatedly determining the local goodness-of-fit and the local signal-to-noise ratio for the plurality of different basis function sets relative to the data locations within the data signal that are encompassed by the basis function for each of the plurality of different basis function sets beginning with the basis function encompassing the largest quantity of data locations and proceeding toward the basis function encompassing the smallest quantity of data locations.

21. The method of claim 14, wherein the data signal comprises a detected image and the information to be extracted comprises an image having minimized degrees of freedom relative to the detected image.

22. The method of claim 21, wherein the detected image is arranged in an image grid corresponding to a plurality of pixels in an image detector and the basis function which encompasses the smallest quantity of data locations corresponds to one pixel in the image detector.

23. The method of claim 22, wherein each basis function is centered on a pixel in the image detector.

24. The method of claim 21, wherein each basis function has a shape selected from the group consisting of circles, ellipses, squares, polygons, parabolic, and Gaussian.

25. The method of claim 14, wherein the data signal comprises time series data and the information to be extracted comprises an image having minimized degrees of freedom relative to the time series data.

26. The method of claim 25, wherein the time series data comprises input from an array of infrared detectors.

27. The method of claim 14, wherein the data signal comprises a signal which is to be modulated for RF transmission and the information to be extracted comprises a minimum number of parameters capable of describing the signal.

28. The method of claim 14, wherein the data signal comprises a signal which is to be encoded for compression.

* * * * *